United States Patent [19]

Stratmann et al.

[11] 4,240,910
[45] Dec. 23, 1980

[54] METHOD AND APPARATUS FOR CLARIFYING COKE QUENCHING WATER

[75] Inventors: Josef Stratmann; Manfred Strobel; Klaus Mrongowius, all of Recklinghausen; Franz Gödde, Stolberg-Venwegen; Wolfgang Schrank, Aldenhoven, all of Fed. Rep. of Germany

[73] Assignee: Firma Carl Still GmbH & Co. KG, Fed. Rep. of Germany

[21] Appl. No.: 89,464

[22] Filed: Oct. 30, 1979

[30] Foreign Application Priority Data

Nov. 18, 1978 [DE] Fed. Rep. of Germany ....... 2850148

[51] Int. Cl.³ .................. B01D 35/00; B01D 37/04
[52] U.S. Cl. ............................. 210/769; 210/801; 210/268; 210/284; 210/803; 210/804; 210/805
[58] Field of Search .............. 210/65, 73, 77, 83, 210/84, 189, 268, 270, 521, 284, 286, 522; 201/39; 202/227, 228, 229, 230

[56] References Cited

U.S. PATENT DOCUMENTS

| | | | |
|---|---|---|---|
| 2,046,756 | 7/1936 | Thomas | 210/77 |
| 3,298,791 | 1/1967 | Meyer et al. | 210/189 |
| 3,667,604 | 6/1972 | Lagoutte | 210/189 |
| 3,767,048 | 10/1973 | Prengemann | 210/77 |
| 3,853,752 | 12/1974 | Tymoszczuk | 210/268 |
| 4,060,484 | 11/1977 | Austin et al. | 210/189 |
| 4,197,201 | 4/1980 | Hjelmner | 210/189 |

FOREIGN PATENT DOCUMENTS 858393 7/1951 Fed. Rep. of Germany .
836424 6/1960 United Kingdom ............... 210/77

*Primary Examiner*—Ernest G. Therkorn
*Attorney, Agent, or Firm*—McGlew and Tuttle

[57] ABSTRACT

A method for clarifying coke quenching water or other waters which are contaminated by solids, with a wide grain spectrum, in an operation in which the fine portions of the solids suspended and carried along with the water are removed from the water by filtration and the clarified water is returned in a cycle, comprising, depositing the water into a filter shaft so that the substances removed from the contaminated water build up in the shaft and themselves form a filter bed, continuing to pass the water through the filter bed from the top to the bottom in a manner so that the velocity of flow of the water in the filter bed decreases constantly and so as to preclarify the water which passes through the bed and subsequently refiltering the preclarified water in a trough basin which rises from the bottom to the top. Thereafter, the refiltered water is directed into a discharge channel from the trough basin which overflows above the basin. During the operation, the bottom of the bed is continuously broken down by mechanical means, such as a screw conveyor, as the top is continuously replenished by directing the solid-containing quenching water into the top of the filter shaft.

10 Claims, 4 Drawing Figures

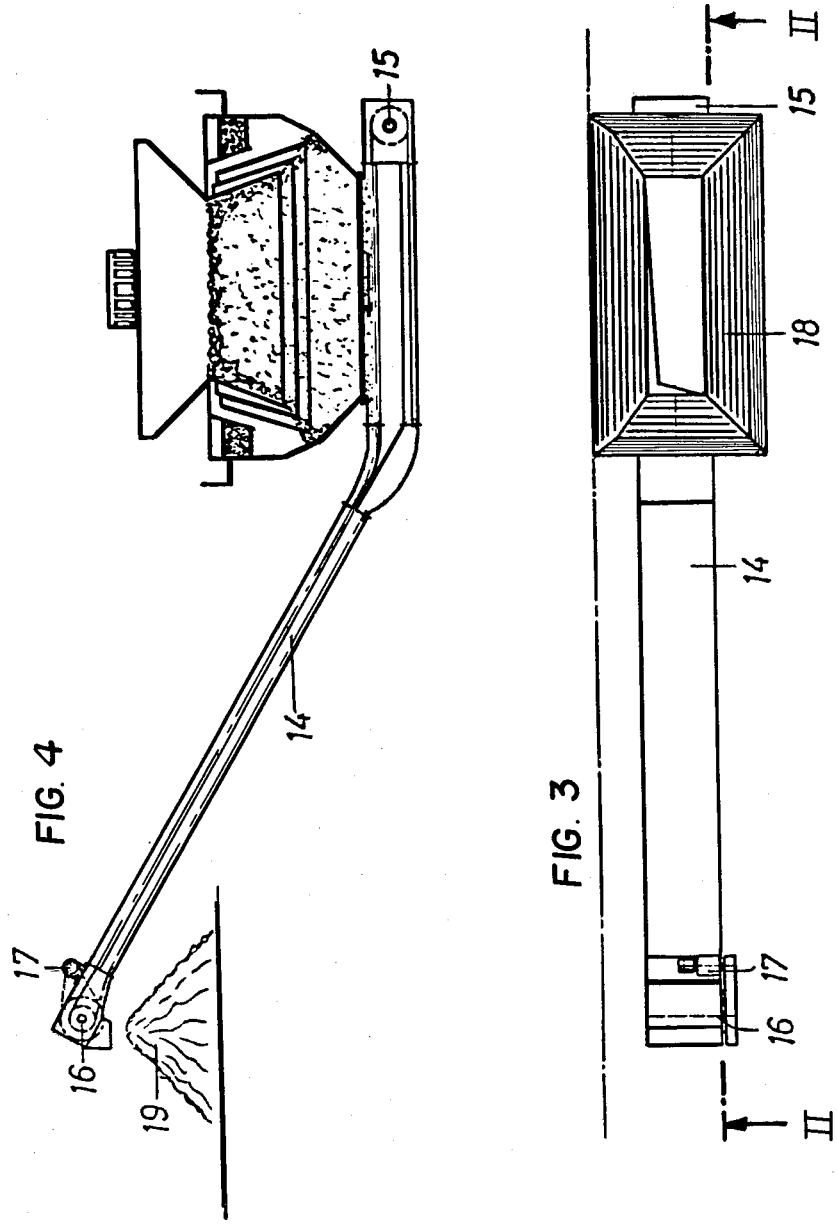

METHOD AND APPARATUS FOR CLARIFYING COKE QUENCHING WATER

FIELD AND BACKGROUND OF THE INVENTION

This invention relates to coking in general and, in particular, to a new and useful apparatus and method for clarifying coke quenching water or other waters contaminated by solids with a wide grain spectrum, where suspended and entrained fine portions of solids are removed from the water by filtration and the clarified water is returned in a cycle.

A method for clarifying coke quenching water is known from German Pat. No. 858,393, in which the contaminated coke quenching water is conducted by fall into a basin and, while rising slowly in the basin, through a filter. The filter may contain lump coke as a filtering material, and must be replaced constantly corresponding to the load.

In arrangements for carrying out the method, a horizontal filter is arranged, for example, in a basin above the outlet of the downpipe of the coke quenching water supply. A downpipe passing through the filter is arranged in the basin for the supply of the contaminated coke quenching water and the receiving end of a bucket conveyor is arranged in the bottom part of the basin and rises outside of the basin. A water discharge is arranged in the upper part of the basin and it has a receiving end which is lower than the upper end of the downpipe. A tank which is placed in the basin has walls which in part form the boundary walls of the basin. A closable water supply for fresh water is located above the filter and a closable water discharge is arranged below the filter.

The realization of this method, as well as the other preparation methods requires large settling basins. Since, in recent years, space has become extremely scarce, particularly for coking plants, in order to save space, space-saving designs of the accessory coking plants are being utilized, whenever possible, since, in many cases, expansion of the coking plant is not possible.

Due to the general increase of the coal and coke throughput in heavy duty coking batteries, the settling basins must become increasingly larger in volume in order to ensure sufficient clarification with increasing amounts of water for the quenching operation.

The operation of the presently known plants also raises problems in other sectors. Thus, the engineering effort for emptying the settling basins by means of shovel dredgers in considerable. In addition, the regular dredging of the settling basins has an adverse effect on the clarification because it causes disturbances in the basins. Measurements have shown that the amounts of dross sucked in by the quenching water pump during the removal of the dross, and also for hours thereafter are up to five times greater than normal. Since there is a direct relationship between these suspended and entrained quantities and the emission of coke dust from the quenching tower, more dust is correspondingly emitted from the quenching tower during this time also.

The object of the present invention, therefore, is to provide a method for clarifying excess coke quenching water and other contaminated waters, in which a large settling basin is not required, the engineering effort for the clarification of the water is reduced, clarification result is improved and the emission of solids during the quenching is decreased.

For the solution of this problem, the invention suggests a method of the above-defined type where the substances removed from the contaminated water themselves form a filter bed, and the water flows, at first, through such a filter from the top to the bottom. The preclarified water is then refiltered in a trough basin rising from the bottom to the top and is then conducted into a discharge channel where the filter, traversed from top to the bottom, is broken down by mechanical means on the underside to the extent at which it is built up on the surface, by the solids arriving with the water.

The water which is filtered from the top to the bottom flows directly after leaving the first filter into a trough basin designed as a calm region, in which, according to the invention, it rises at a lower speed than it sinks in the inner filter.

The direction of flow and the uniform distribution of the water over the entire cross-section can be controlled in the trough basin, according to the invention, so that one or more vertically adjustable partitions are provided in the trough basin.

In order to prevent flying ashes from the coking plant and very fine suspended matter in the quenching water from getting into the clarified water where the filter has disturbances, it is advisable for the water to pass through a replaceable screen and/or a second filter of lump coke, nut coke, coke dust or other regenerable material, such as gravel, preferably, from the bottom to the top, before it enters the discharge channel.

A particularly suitable arrangement for carrying out the method, according to the invention, consists of a filter shaft, which is open at the top and has vertical walls or walls offset at the bottom, and includes an upper storage chamber for the water, which is intermittently introduced.

The contaminated quenching water is fed to the first filter over a channel with adjustable outlet openings which ensure a uniform distribution of the water over the entire filter surface, so that the material of the filter slides by itself into or onto the discharge device, one or several of which are connected with the bottoms. Between the inclined bottoms and the bottom edge of the filter shaft walls, there is a sufficiently large interval that the water issuing from the inner filter shaft can flow at a lower speed into the outer trough basin than that which corresponds to the sinking speed in the upper part of the coke filter.

In a preferred embodiment of the invention, frame-type, vertically adjustable nested partitions, acting as straightening blades, are arranged in the trough basin around the inner filter shaft in those areas where the filtered water rises. Both the upper overflow edge and the bottom edge of the partitions are arranged slightly lower from wall to wall and from the inside to the outside. The resistances to the water issuing from the coke dust, which vary over the surface of the filter arrangement, can thus be compensated so that the entire surface of the trough is optimally utilized by the uniform rising speed of the water.

In the method according to the invention, the first filter is renewed so that the height portion of the filter built up at the top by the arriving coke dust is mechanically broken down on the underside is exactly the same amount. The removal of the filter material can be effected by known conveyor and branching means, one or several conveyor screws, bucket conveyors, multicell belts, chain conveyors, broaching plows, etc.

To ensure a constant filter thickness, it is advantageous if the conveyor devices remove the filter material automatically, controlled by filling level monitors. If necessary, two such coke filter plants can be arranged side-by-side or in tandem, and they may be operated alternately. In general, however, one of these plants will be sufficient.

Tests on arrangements, according to the invention, have shown surprisingly that the liberation of the quenching water of solids contained therein is substantially improved by this type of filtration, compared to the conventional plants. Since a part of the solids contained in the quenching water gets into the atmosphere during the quenching of the coke by the lift of the steam, a reduction of the solid content in the quenching water leads, at the same time, to a reduction of the dust emissions during the quenching of the coke, which helps to reduce environment pollution. Furthermore, a small amount of coke dust in the quenching water leads to less wear of the pump and pipe line system. An additional advantage of the invention is the relatively small dimensions of the arrangement, so that it is also possible to install it in existing settling basins, and the technical expenditures are greatly reduced overall.

The method also has an advantageous effect on an important quality feature, the so-called M10 value, and on the appearance of the coke which is produced thereby, because the solids quenched again in the quenching water cycle and not deposited there are transferred to the coke, thus imparting the known dark color to the coke. On the other hand, the invention produces a coke with the desired silver-grey appearance.

Accordingly, an object of the present invention is to provide a method for clarifying coke quenching water or other waters contaminated by solids with a wide grain spectrum, where the fine portions of solids suspended and carried along in the water are removed from it by filtration, and the clarified water is returned in a cycle, comprising, depositing the water into a filter shaft so that the substances removed from the contaminated water themselves form the filter bed in the shaft, continuing to pass the water through the filter bed from the top to the bottom in a manner so that the velocity of water flow in the filter bed decreases constantly and the water which passes therethrough is preclarified, subsequently refiltering the preclarified water in a trough basin which rises from the bottom to the top, directing the refiltered water into a discharge channel, and breaking down the filter bed on its underside to the same extent as it is being built up by the direction of the quench water with the solids therein into the filter shaft.

A further object of the invention is to provide an apparatus for clarifying coke quenching water and similar water-containing solids, which comprises, a storage container which has a downwardly narrowing top portion and a downwardly widening bottom portion beneath said top portion with a feed channel disposed above the top portion having a discharge for discharging the quenching water into the top portion so that it accumulates in a filter shaft formed by the bottom and top portions and flows upwardly and through a trough basin surrounding the top portion so that the prefiltered water is refiltered, the filter shaft having a bottom discharge with means for carrying away a portion of a bottom of the bed which is equivalent to the amount being built up by the discharge of the water-containing solids therein.

Another object of the invention is to provide an apparatus for clarifying coke quenching water which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a schematic top plan view of another embodiment of the invention; and

FIG. 4 is a longitudinal sectional view taken along the line II—II of FIG. 3.

DESCRIPTION OF THE PREFERRED EMBODIMENTS

Figure 1:
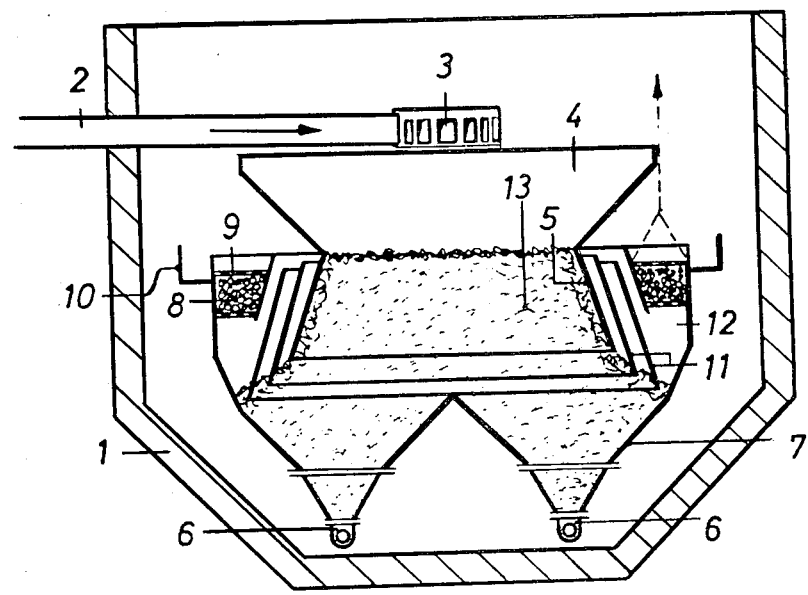
FIG. 1 is a transverse sectional view of a device for purifying coke quenching water constructed in accordance with the present invention, and taken along the line I—I of FIG. 2.

Referring to the drawings in particular, the invention embodied therein, comprises a device for purifying coke quenching water and other waters contaminated by solids which have a wide variety of grain structures. The fine portions of the solids suspended and carried along in the water are removed from the water by directing it through a feed channel 2, discharging it through outlet openings 3 into a filter shaft 5, in a manner such that the solids of the water begin accumulating in the shaft and form a filter bed through which a subsequent flow of water is filtered. The bed is maintained at a proper height by means, such as a conveyor 6, which carries off a quantity of the filter bed which substantially equals the quantity which was added to the bed by the discharge of the quenching water thereto.

FIG. 1 shows the arrangement of the entire filter device in a large basin 1, which may already exist in the plant, and whose walls project over feed channel 2 of the water with the outlet openings 3. From outlet openings 3, which are provided in the center above the filter, the water arriving intermittently during the short quenching periods flows into the funnel-shaped storage chamber 4 and then flows down evenly into filter shaft 5, filled with coke dust 13.

The outer walls of shaft 5 are directed to the outside, so that the cross-section of filter shaft 5 increases gradually downward, and the sinking speed in the filter gradually decreases. From inner filter shaft 5, the water then flows at the bottom into trough basin 12 which is arranged around filter shaft 5, and in which it rises at a lower speed than the sinking speed of the solids. A uniform rise of the water in trough basin 12 is ensured by the vertically adjustable partitions 7, which are inserted at different levels, corresponding to the different resistances to flow, thus acting as straightening blades.

Before the purified water runs off over discharge channel 10 into a storage tank, it is conducted from the bottom to the top through a replaceable second filter 8 and a fine-meshed retaining screen 9, so that the clarified water contains no impurities whatsoever. These devices 8 and 9 can be partially cleaned in a very simple manner.

Figure 2:
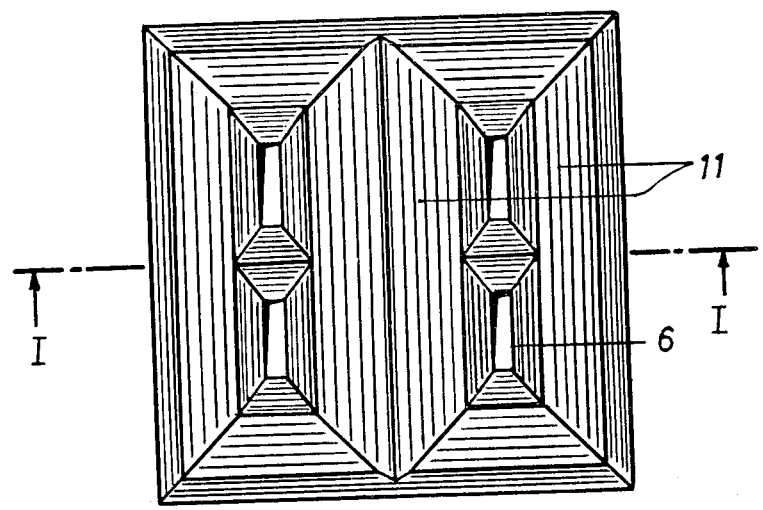
FIG. 2 is a top plan view of the device shown in FIG. 1.

The fine coke and dust 13 slides down in the course of time in filter shaft 5 and funnel-shaped discharge 11/18 and is removed, for example, with a screw conveyor 6, (See FIGS. 1 and 2) or with a chain conveyor 14 (See FIGS. 3 and 4).

FIGS. 3 and 4 show the arrangement of revolving chain conveyors with a watertight housing in the range below the water level, where the fine coke 13 under the filter device described in FIG. 1 is removed and conveyed out of the water, upward to depot 19. During the movement to depot 19, the deposited solids are, at the same time, dehydrated. Chain conveyor 14 is driven by a motor 17 and is deflected at the top and bottom by rollers 15 and 16.

EXAMPLE

The coke charges produced in a coke oven plant in an amount of twelve tons and quenched under the quenching tower with a total of about 17 cu m water. Corresponding to the sensible heat in the glowing coke, about 6 cu m water are evaporated, with the rising steam removing an additional one or two cu m of the water flowing in counterflow with the quenching tower.

Consequently, nine or ten cu m excess water with about 80 kg of suspended fine coke are thus obtained, per quenching operation. These quantities are fed in about three minutes (quenching time and idle time of the channel system to the clarifying apparatus) and must be clarified during this time.

This requires a filter device according to FIG. 1, which is about six m long and six m wide and about three m high from the bottom edge of conveyor device 6 to the top edge of feed channel 2. In comparison, the area of today's settling basins is about five to eight times greater with the same capacity.

The inner filter shaft 5 has an area of 2×2 m at its narrowest point and widens downwardly to an area of about 3×3 m. The solid coat in the filter shaft extends approximately to the upper narrowest point and projects at this point about 200 mm over the water drain edge.

Since the velocity of flow in the debris is, as known, a function of the mean grain diameter of the grain spectrum, there is a constant draining speed during the passage through the filter. This speed was determined with about 1.5 cm/sec. for a representative fine coke grain size range. This means that, under normal operating conditions, the water cannot dam-up at the inlet end. If these operating conditions should change, the free space above the filter can be used as a storage chamber.

According to the above-described load case, the filter is admitted with about 55 cu dm per seconds. The resulting velocity of flow of 1.5 cm/sec. drops to about 0.4 cm/sec., due to the constructional design of the arrangement, according to the invention. At this low exit velocity, solids with a particle size of over 20$\mu$ are no longer carried along by the water. This means that over 99% of the impurities are retained by the filter.

While specific embodiments of the invention have been shown and described in detail to illustrate the application of the principles of the invention, it will be understood that the invention may be embodied otherwise without departing from such principles.

What is claimed is:

1. A method of clarifying coke quenching water where the fine portions of the solids suspended and carried along in the water are removed from the water by filtration and the clarified water is returned in an operational cycle, comprising, depositing the quenching water into the filter shaft so that the substances removed from the water themselves form a filter bed which accumulates in the shaft, continuing to pass the quenching water through the filter bed from the top to the bottom so that the solids accumulate at the top in the bed and the water is preclarified, subsequently refiltering the preclarified water in a trough basin so that it rises from the bottom to the top, directing the refiltered water into a discharge, breaking the filter bed down on its underside to remove a portion of the filter bed to substantially the same extent as is being built up on the top surface by the solids arriving with the water.

2. A method of clarifying coke quenching water, as claimed in claim 1, wherein the water is passed through the filter beds from the top to the bottom in a manner so that the velocity of flow of the water in the filter bed decreases constantly, the trough basin being formed as a calm water region adjacent the filter bed and the water which is preclarified being directed through the basin at a slower speed that it sinks in the filter material in the filter shaft.

3. A method of clarifying coke quenching water, as claimed in claim 1, wherein the direction of flow in the trough basin and the uniform distribution of the water of the entire cross-section are controlled by conducting the outflowing water over one or several vertically adjustable partitions.

4. A method of clarifying coke quenching water, as claimed in claim 1, wherein the water, before it is conducted into the discharge channel, passes through a replaceable screen or through a second filter of lump coke, nut coke, fine coke or other regenerable material, such as gravel, and preferably in a direction from the bottom up to the top thereof.

5. A method of clarifying coke quenching water, as claimed in claim 1, wherein, in order to maintain a uniform filter layer thickness, the removal of the filter material is controlled automatically.

6. A device for clarifying coke quenching water, or similar water containing solids, comprising, a storage container having a downwardly narrowing top portion and a downwardly widening bottom portion below said top portion, a feed channel having a discharge for quenching water disposed over said top portion and arranged to discharge the quenching water therein, said bottom portion having partition walls defining an interior filter shaft and a surrounding trough basin permitting the build up of solids in the filter shaft to form a filter bed therein, an exterior discharge channel above said trough basin for the upflow of the water having a retaining screen top through which the water may run off, a bottom discharge below said filter shaft, and means extending through said bottom discharge of said filter shaft for drawing away the bottom sides of the bottom of said filter bed as the top is replenished by the solids of the quench water.

7. A device for clarifying coke quenching water, as claimed in claim 6, wherein said partitions include vertically adjustable partition walls surrounding the sides of said filter shaft, said partitions forming frames nested around said inner filter shaft having an upper overflow edge and a bottom edge arranged somewhat lower from wall to wall from the inside to the outside.

8. A device for clarifying coke quenching water, as claimed in claim 6, wherein said partition walls include a plurality of laterally spaced wall portions defining overflow parts surrounding said filter shaft, said filter shaft having lateral portions extending above the filter material and overlying said partitions defining said trough basin therebelow.

9. A device for clarifying coke quenching water, as claimed in claim 6, wherein said means for drawing away the bottom of the filter bed comprises an inlet chain conveyor.

10. A device for clarifying coke quenching water, as claimed in claim 6, wherein said means for drawing away the bottom of the solids from the bottom of the filter bed comprises a screw conveyor.

* * * * *